United States Patent
Ying et al.

(10) Patent No.: US 12,066,455 B2
(45) Date of Patent: Aug. 20, 2024

(54) TRIBOELECTRIC NANOGENERATOR (TENG) AND SELF-DRIVEN WIND SPEED AND WIND DIRECTION SENSING DEVICE

(71) Applicant: ZHEJIANG UNIVERSITY, Hangzhou (CN)

(72) Inventors: Yibin Ying, Hangzhou (CN); Shufen Dai, Hangzhou (CN); Xunjia Li, Hangzhou (CN); Jianfeng Ping, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/924,121

(22) PCT Filed: Nov. 2, 2021

(86) PCT No.: PCT/CN2021/128194
§ 371 (c)(1),
(2) Date: Nov. 9, 2022

(87) PCT Pub. No.: WO2023/000542
PCT Pub. Date: Jan. 26, 2023

(65) Prior Publication Data
US 2024/0219418 A1    Jul. 4, 2024

(30) Foreign Application Priority Data

Jul. 20, 2021   (CN) .......................... 202110820357.4
Jul. 20, 2021   (CN) .......................... 202110820366.3

(51) Int. Cl.
*G01P 5/08*    (2006.01)
*B33Y 80/00*   (2015.01)
(Continued)

(52) U.S. Cl.
CPC . *G01P 5/08* (2013.01); *C08J 5/18* (2013.01); *H02N 1/04* (2013.01); *B33Y 80/00* (2014.12)

(58) Field of Classification Search
CPC ... B33Y 80/00; C08J 5/18; G01P 5/08; H02N 1/04
See application file for complete search history.

(56) References Cited

U.S. PATENT DOCUMENTS

2016/0218640 A1 * 7/2016 Wang .................... H02N 1/04
2016/0344308 A1   11/2016 Wang et al.

FOREIGN PATENT DOCUMENTS

CN    104124887 A  * 10/2014  .............. F03D 5/00
CN    106568986 A    4/2017
(Continued)

OTHER PUBLICATIONS

Han et al, Paper-based triboelectric nanogenerators and their applications: a review, Beilstein J. Nanotechnol. 2021, 12, 151-171 (Year: 2021).*

(Continued)

*Primary Examiner* — David L Singer
(74) *Attorney, Agent, or Firm* — Bayramoglu Law Offices LLC

(57) ABSTRACT

A triboelectric nanogenerator with slit effect (SE-TENG) and a self-driven wind speed and wind direction sensing device. The TENG includes a wind cavity with slit effect, a triboelectric layer, a hydroxyethyl cellulose (HEC) film, and indium tin oxide (ITO) electrodes. The wind cavity is provided with an inlet end and an outlet end. A layer of the electrode and a triboelectric layer are fixedly adhered to the upper surface and the lower surface of an inner wall of the wind cavity. The wind cavity is provided with a horizontally arranged support bar perpendicular to a wind direction in a middle close to the inlet end. The HEC film includes one end fixedly adhered to the support bar, and the other end extend- (Continued)

ing freely toward the outlet end. The sensing device includes a plurality of SE-TENGs which are fixed on a circumference of a ring. The sensing device can be used in an agricultural environment.

10 Claims, 7 Drawing Sheets

(51) Int. Cl.
*C08J 5/18* (2006.01)
*H02N 1/04* (2006.01)

(56) References Cited

FOREIGN PATENT DOCUMENTS

| | | | | |
|---|---|---|---|---|
| CN | 207281088 U | * | 4/2018 | ............... G01P 1/00 |
| CN | 109420246 A | | 3/2019 | |
| CN | 110501518 A | * | 11/2019 | ............... G01P 1/00 |
| CN | 110729916 A | | 1/2020 | |
| CN | 111765995 A | | 10/2020 | |
| CN | 113067495 A | | 7/2021 | |
| WO | WO-2014169724 A1 | * | 10/2014 | ............... H02N 1/04 |

OTHER PUBLICATIONS

Zaw et al, Omnidirectional Triboelectric Nanogenerator Operated by Weak Wind towards a Self-Powered Anemoscope, Micromachines 2020, 11, 414; doi: 10.3390/mi11040414 (Year: 2020).*

Xia et al, An Optimized Flutter-Driven Triboelectric Nanogenerator with a Low Cut-In Wind Speed, Micromachines 2021, 12, 366. https://doi.org/10.3390/mi12040366 (Year: 2021).*

Liu et al, A High Sensitivity Self-PoweredWind Speed Sensor Based on Triboelectric Nanogenerators (TENGs), Sensors 2021, 21, 2951. https://doi.org/10.3390/s21092951 (Year: 2021).*

Wang et al, Self-Powered Wind Sensor System for Detecting Wind Speed and Direction Based on a Triboelectric Nanogenerator, ACS Nano 2018, 12, 3954-3963, DOI: 10.1021/acsnano.8b01532 (Year: 2018).*

Yang et al, Triboelectric Nanogenerator for Harvesting Wind Energy and as Self-Powered Wind Vector Sensor System, ACS Nano 2013, vol. 7, No. 10, 9461-9468 (Year: 2013).*

Shufen Dai, et al, Omnidirectional wind energy harvester for self-powered agro-environmental information sensing, Nano Energy, 2022, pp. 1-10, vol. 91, 106686.

* cited by examiner

TRIBOELECTRIC NANOGENERATOR (TENG) AND SELF-DRIVEN WIND SPEED AND WIND DIRECTION SENSING DEVICE

CROSS REFERENCE TO THE RELATED APPLICATIONS

This application is the national phase entry of International Application No. PCT/CN2021/128194, filed on Nov. 2, 2021, which is based upon and claims priority to Chinese Patent Application No. 202110820357.4, filed on Jul. 20, 2021; Chinese Patent Application No. 202110820366.3, filed on Jul. 20, 2021, the entire contents of which are incorporated herein by reference.

TECHNICAL FIELD

The present disclosure relates to a triboelectric nanogenerator (TENG) and a self-driven wind speed and wind direction sensing device and, in particular, to a TENG with slit effect (SE-TENG) to efficiently harvest wind energy and a self-driven wind speed and wind direction sensing device composed thereof.

BACKGROUND

As one of the most critical environmental factors in agricultural production, wind can spread plant pollen and seeds, which is beneficial to plant growth and propagation. In addition, wind accelerates the rebalancing of oxygen and carbon dioxide concentrations in the air, enhancing crop respiration and photosynthesis. However, some adverse effects of wind on agriculture, such as the spread of pathogens and plant diseases, soil erosion, and crop damage, have caused huge agricultural production and economic losses worldwide. Therefore, in the process of planting crops, the wind speed and wind direction in the farmland should be monitored around the clock to prevent large-scale agricultural disasters. In addition, by obtaining accurate wind information, suitable agricultural planting plans can be dynamically formulated to increase yields.

Wind energy resources are abundant, renewable, and widely distributed and play an important role in global green energy. As wind turbine technology has been extensively researched, many large wind farms have been built. A single wind turbine operating under optimized conditions can generate megawatts of power, but these machines are only effective when wind speed exceeds 3 m/s. However, wind available in the environment is a low-speed airflow below the threshold speed of the cavity. The ubiquitous ambient wind energy can serve as an effective micro-energy source for current small portable electronic devices and the Internet of Things. Part of the energy is wasted because traditional turbines cannot efficiently harvest the breeze energy. In addition, it is generally believed that the harvesting of breeze energy is limited, which may be due to the inefficiency of these conventional energy harvesting devices in low-speed winds. Therefore, there is an urgent need for a device that operates efficiently in low-speed winds, and a method for breeze energy harvesting.

Moreover, traditional wind speed and wind direction sensors have some problems, such as high energy consumption, large volume, low precision, and poor stability, which limit their application in agriculture. In particular, real-time monitoring of agricultural and environmental parameters through traditional sensors requires a continuous power supply, and laying power supply cables in complex farmland is a challenge. As an alternative, a battery is usually used as a temporary power source for agricultural sensors. However, the battery needs to be replaced or recharged regularly, which can cause maintenance difficulties and serious contamination of soil and water in the agricultural environment. Therefore, it is necessary to design self-powered wind speed and wind direction sensors based on degradable and eco-friendly materials to realize a sustainable intelligent monitoring agricultural system without an external energy supply.

Recently, the invention of TENGs has provided an unprecedented method for wind energy harvesting. TENGs can effectively convert the micro-energy in the environment into electric energy output, especially the energy with low mechanical frequency, such as wind energy, raindrop energy, and water wave energy. Many TENGs for wind energy harvesting have been reported, in which various novel architectures and materials have been used. However, these reports focus on harvesting wind energy at a high speed greater than 5 m/s, and breeze energy harvesting using the equipment is not feasible because the minimum operating speed threshold for the equipment is still quite high. To harvest energy from the low-frequency excitation of mild winds, the materials and structure of the entire equipment must be systematically optimized to obtain a double-frequency output. Therefore, systematic optimization of materials and structures of the existing TENGs is required to realize low-speed wind energy harvesting from the environment.

Moreover, there is little research work on developing self-driven wind speed and wind direction sensing in agriculture, so the prior art lacks a self-driven wind speed and wind direction sensing device and processing method in the agricultural environment.

SUMMARY

In order to solve the problems mentioned above and fill in the missing gaps in the Background, the present disclosure provides a triboelectric nanogenerator with slit effect (SE-TENG) and double-frequency vibration of a stretchable hydroxyethyl cellulose (HEC) film to realize efficient harvesting of wind energy at low-wind speed. The designed SE-TENG can realize wind speed sensing in a range of 0.5-10 m/s, indicating the superiority of SE-TENG in energy harvesting at low-wind speeds.

The SE-TENG of the present disclosure has a relatively wide sensing range, which can harvest wind energy as low as 0.5 m/s and can be used as a TENG in the agricultural environment, which solves the technical problem that traditional wind speed sensors need external energy supply equipment. It is of great significance for TENG-based power supply in agriculture.

The present disclosure further provides a self-driven wind speed and wind direction sensing device applied in the agricultural environment, which solves the technical problem that traditional wind speed and wind direction sensors need external energy supply equipment. It is of great significance for TENG-based self-driven wind speed and direction sensing in agriculture.

The present disclosure adopts the following technical solutions.

I. TENG with Slit Effect:

The TENG includes a wind cavity, a triboelectric layer, an HEC film, and indium tin oxide (ITO) electrodes. The wind cavity is provided with an inlet end and an outlet end. The triboelectric layer is respectively fixed on the upper surface and the lower surface of the inner wall of the wind cavity.

The wind cavity is provided with a horizontally arranged support bar perpendicular to a wind direction in a middle close to the inlet end. The HEC film includes one end fixedly adhered to the support bar, and the other end extending freely toward the outlet end.

The wind cavity includes the inlet end connected to a horn-shaped cavity and the outlet end connected to a curved upward cavity. The inlet end of the cavity is designed as a mouth of a horn to facilitate the entry of wind energy. The middle part of the cavity is narrowed relative to the inlet end. The slit effect can be used to increase the wind speed in the working area of the SE-TENG and improve the sensitivity of wind speed detection.

The triboelectric layer may be made from one selected from the group consisting of polytetrafluoroethylene (Teflon), polydimethylsiloxane (PDMS), polyimide (Kapton), polyvinyl chloride (PVC), silicone rubber (Ecoflex), and polylactic acid (PLA).

A layer of conductive material may be adhered to or plated between the triboelectric layer and the inner wall of the wind cavity as an electrode.

The conductive material may be one selected from the group consisting of conductive materials, such as ITO, silver nanowires, copper, and aluminum.

II. Preparation Method for the SE-TENG:
(1) processing the wind cavity by 3D printing;
(2) preparing the HEC film: adding fiber powder to water or an ethanol aqueous solution, adding a plasticizer, heating in a water bath to mix the solution evenly, evaporating a solvent, and drying to obtain the HEC film;
(3) fixing one end of the HEC film on the support bar of the wind cavity, adhering a layer of conductive material as an electrode to the upper surface and the lower surface of the inner wall of the wind cavity, respectively, and adhering a layer of triboelectric material outside the electrode with the triboelectric material completely covering the electrode; and
(4) connecting lead wires from the top and bottom electrodes to two pins at an alternating-current (AC) terminal of a rectifier bridge, and connecting the other two pins of the rectifier bridge to external power receiving equipment to form the complete SE-TENG.

The plasticizer may be a mixture of glucose and urea. The glucose and the urea work together.

Step (2) may specifically include: weighing and adding 1-5 g of HEC, 0.3-1.5 g of glucose, and 0.1-0.5 g of urea into 100 mL of deionized water, stirring, and heating in a water bath at 50° C. for 60 min, centrifuging and degassing an obtained solution at 10,000 r/min for 5 min, pouring the solution into a petri dish to bake for 6-12 h, and equilibrating under a 30-80% air humidity for 3 h to obtain the HEC film.

The HEC, the glucose, the urea, and the water have a mass ratio of 8:3:1:200, and the optimal ratio is to add 4 g of HEC, 1.5 g of glucose, and 0.5 g of urea into 100 mL of deionized water. The HEC film prepared by the present disclosure has the characteristics of flexibility, transparency, and stretchability.

Different from previously reported generators for wind energy harvesting, the SE-TENG of the present disclosure can effectively achieve double-frequency vibration under mild airflow drive by using the slit effect of the stretchable HEC film and cavity. The designed SE-TENG can realize wind speed sensing in a range of 0.5-10 m/s, indicating the superiority of SE-TENG in the energy harvesting at low-wind speeds. The present disclosure realizes an effective strategy to harvest the ubiquitous but often overlooked low-speed airflow and mild intermittent wind sources, which can serve as an effective complement to the current micro-energy structure.

III. Self-Driven Wind Speed and Wind Direction Sensing Device:

The self-driven wind speed and wind direction sensing device includes at least a SE-TENG and an electrometer data acquisition (DAQ) board. The SE-TENG is arranged on the electrometer DAQ board.

The SE-TENG includes a wind cavity, a triboelectric layer, an HEC film, and ITO electrodes. The wind cavity is provided with an inlet end and an outlet end. One triboelectric layer is fixed on an upper surface and a lower surface of an inner wall of the wind cavity. The wind cavity is provided with a horizontally arranged support bar perpendicular to a wind direction in a middle close to the inlet end. The HEC film includes one end fixedly adhered to the support bar and the other end extending freely toward the outlet end.

Eight SE-TENGs are arranged. The eight SE-TENGs are fixed on a circumference of a ring at an interval of a central angle of 45° in a radial direction. The eight SE-TENGs are connected to the electrometer DAQ board. Electrical signals generated by the SE-TENGs are acquired and processed through the electrometer DAQ board and are wirelessly transmitted to a mobile terminal in real-time through Bluetooth.

The wind cavity may include the inlet end connected to a horn-shaped cavity and the outlet end connected to a curved upward cavity.

The triboelectric layer may be made from one selected from the group consisting of polytetrafluoroethylene (Teflon), PDMS, polyimide (Kapton), PVC, silicone rubber (Ecoflex), and PLA.

A layer of conductive material may be adhered to or plated between the triboelectric layer and the inner wall of the wind cavity as an electrode.

The conductive material may be one selected from the group consisting of conductive materials such as ITO, silver nanowires, copper, and aluminum.

IV. Preparation Method for the Self-Driven Wind Speed and Wind Direction Sensing Device:
(1) processing the wind cavity by 3D printing;
(2) preparing the HEC film: adding fiber powder to water or an ethanol aqueous solution, adding a plasticizer, heating in a water bath to mix the solution evenly, evaporating a solvent, and drying to obtain the HEC film;
(3) fixing one end of the HEC film on the support bar of the wind cavity, adhering a layer of conductive material as an electrode to the upper surface and the lower surface of the inner wall of the wind cavity, respectively, and adhering a layer of triboelectric material outside the electrode with the triboelectric material completely covering the electrode;
(4) connecting lead wires from the top and bottom electrodes to two pins at an AC terminal of a rectifier bridge, and connecting the other two pins of the rectifier bridge to external power receiving equipment to form the complete SE-TENG; and
(5) distributing eight SE-TENGs on the circumference of the ring at an interval of a central angle of 45° in the radial direction, and cooperating with the electrometer DAQ board to form the self-driven wind speed and wind direction sensing device.

The plasticizer may be a mixture of glucose and urea. The glucose and the urea work together.

Step (2) may specifically include: weighing and adding 1-5 g of HEC, 0.3-1.5 g of glucose, and 0.1-0.5 g of urea into 100 mL of deionized water, stirring, and heating in a water bath at 50° C. for 60 min, centrifuging and degassing an obtained solution at 10,000 r/min for 5 min, pouring the solution into a petri dish to bake for 6-12 h, and equilibrating under a 30-80% air humidity for 3 h to obtain the HEC film.

The HEC, the glucose, the urea, and the water have a mass ratio of 8:3:1:200, and the optimal ratio is to add 4 g of HEC, 1.5 g of glucose, and 0.5 g of urea into 100 mL of deionized water. The HEC film prepared by the present disclosure has the characteristics of flexibility, transparency, and stretchability.

Compared with the prior art, the present disclosure has the characteristics of high sensitivity, high effect range, and simple preparation, the present disclosure can maintain stable operation for a long time and is an excellent substitute for effective harvesting of weak wind energy in the environment.

The TENGs reported in the prior art focus on harvesting wind energy at a high speed greater than 5 m/s, and breeze energy harvesting using the equipment is not feasible because the minimum operating speed threshold for the equipment is still quite high. To harvest energy from the low-frequency excitation of mild winds, the materials and structure of the entire equipment must be systematically optimized to obtain a double-frequency output. Therefore, systematic optimization of materials and structures of the existing TENGs is required to realize low-speed wind energy harvesting from the environment.

Different from previously reported generators for wind energy harvesting, the SE-TENG can effectively realize double-frequency vibration under mild airflow by the slit effect of the stretchable HEC film and cavity. The designed SE-TENG can realize wind speed sensing in a range of 0.5-10 m/s, indicating the superiority of SE-TENG in the energy harvesting at low-wind speeds.

The wind speed sensing device in the prior art can only sense the wind speed in a certain direction, but the present disclosure can sense not only the wind speed in any direction but also the wind direction by assembling a plurality of wind cavities into a system. In addition, the present disclosure designs the electrometer DAQ board matched with the self-driven wind speed and wind direction sensing device for data acquisition and processing, and wirelessly transmits information to a mobile terminal in real-time through Bluetooth. Users can obtain wind speed and wind direction information in real-time and make timely adjustments to agricultural production. In addition, electric energy generated by the self-driven wind speed and wind direction sensing device during wind speed sensing is also harvested to drive the agricultural sensor.

The omnidirectional wind energy harvester (OWEH) of the novel agricultural self-driven wind speed and wind direction sensing device based on the SE-TENG of the present disclosure can not only be used for wind speed and wind direction sensing but also serve as a sustainable power source for wireless sensors, providing a reliable foundation for building intelligent agriculture.

DETAILED DESCRIPTION OF THE EMBODIMENTS

The present disclosure is described in further detail below regarding the accompanying drawings and specific examples.

Figure 1:
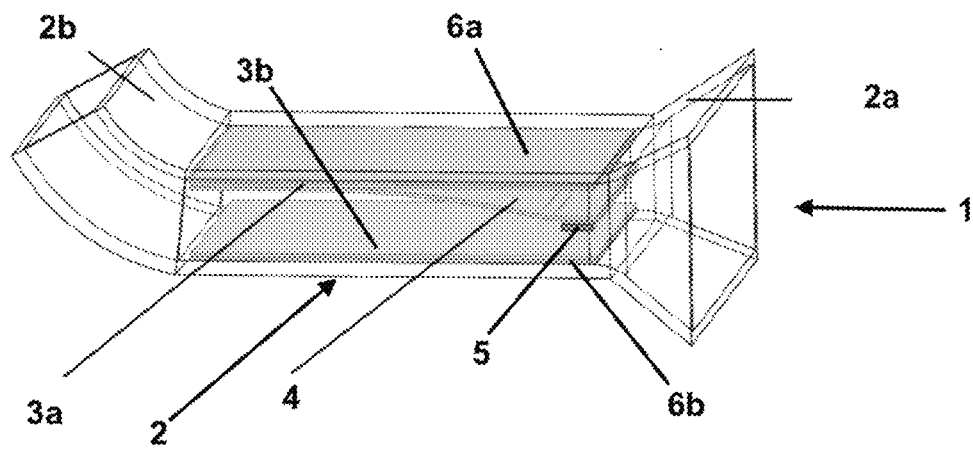
FIG. 1 is a schematic structural diagram of a SE-TENG designed in the present disclosure.
Figure 8:
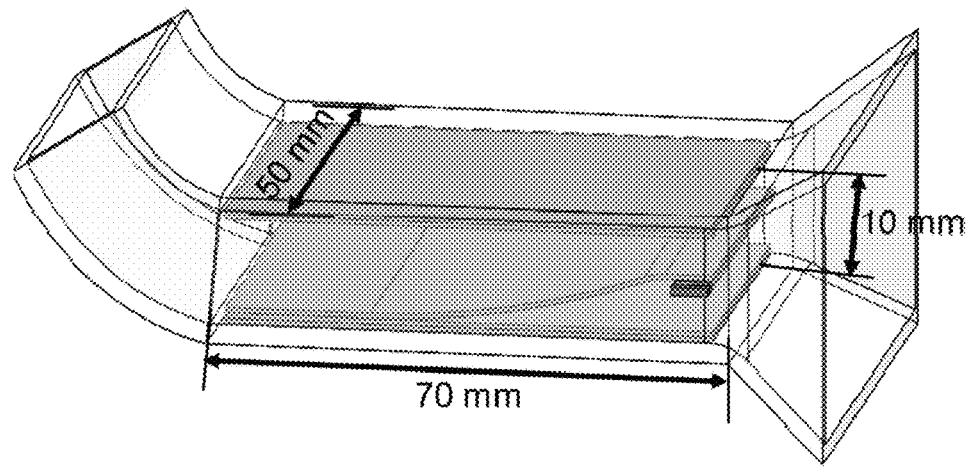
FIG. 8 is a schematic diagram of the specific dimensions of the SE-TENG designed by the present disclosure.

As shown in FIG. 1 and FIG. 8, a TENG (1) is a SE-TENG based on the slit effect and an HEC film. The TENG includes a wind cavity (2), a triboelectric layer (3a, 3b), an HEC film (4), and ITO electrodes (6a, 6b). The wind cavity is provided with an inlet end and an outlet end. A connecting line between the inlet end and the outlet end of the wind cavity is arranged parallel to and towards a wind direction. The wind cavity includes the inlet end connected to a horn-shaped cavity (2a) and the outlet end connected to a curved upward cavity (2b).

One triboelectric layer is fixed on the upper surface (3a) and the lower surface (3b) of an inner wall of the wind cavity. The upper and lower triboelectric layers are arranged in parallel. The wind cavity is provided with a horizontally arranged support bar (5) perpendicular to a wind direction in the middle close to the inlet end. The HEC film (4) includes one end fixedly adhered to the support bar and the other end extending freely toward the outlet end. A layer of conductive material is adhered or plated between the triboelectric layer and the inner wall of the wind cavity as an electrode (6a, 6b). The HEC film (4) is used as a triboelectric electron donating layer, and the triboelectric electron donating layer is adhered to the middle of the wind cavity.

A distance between the upper and lower triboelectric layers (3a, 3b) is greater than the HEC film (4) thickness, and the HEC film (4) vibrates and swings with the wind when blown by the wind in the gap between the upper and lower triboelectric layers (3a, 3b) and reciprocates to contact the triboelectric layer, like a piece of cloth blown by the wind. The electrical signal output of the SE-TENG is realized through the contact and separation motion between the HEC film (4) and the triboelectric layer.

The TENG (1) of the present disclosure has four working modes, vertical contact-separation mode, lateral sliding mode, single-electrode mode, and freestanding triboelectric-layer mode. All the four modes work.

Or the positions of the triboelectric layer and the HEC film are replaced with each other, that is, the triboelectric layer is adhered to the support bar of the wind cavity, and the HEC film is adhered to the upper and lower sides of the inner wall of the wind cavity.

In a specific implementation, the wind cavity of the SE-TENG can be prepared by 3D printing. The horn-shaped cavity at the inlet of the wind cavity has a large diameter and a relatively narrow interior, such that the tiny wind can be amplified by the slit effect to realize high-sensitivity wind speed sensing. One side of the HEC film is fixed in the middle of the wind cavity, and the other side is free. PDMS films and ITO electrodes are attached to the upper and lower inner walls of the wind cavity, and two wires are led from the top and bottom electrodes.

As shown in FIG. 8, the working area inside the wind cavity has a size of 7 cm×5 cm×1 cm. Both the HEC and PDMS films used have a thickness of 100 μm.

In the present disclosure, the electrical signal generated by the SE-TENG is correlated with the wind speed, and the wind speed is sensed by the strength of the electrical signal generated by the SE-TENG. A higher strength of the electrical signal generated by the SE-TENG indicates a greater wind speed.

In a specific implementation, a plurality of SE-TENGs can be arranged at intervals on the circumference of the same ring. In addition, the plurality of SE-TENGs arranged along the circumference is used for sensing in different directions and orientations, and the wind direction is obtained by synthesizing the strength of the electrical signal of the plurality of SE-TENGs.

In the present disclosure, the HEC film prepared by the casting method is used for constructing the SE-TENG, and the HEC film can be cut into any desired shape.

The preparation process of the SE-TENG of the present disclosure was as follows.

(1) The wind cavity was processed by 3D printing.
(2) The HEC film was prepared as a triboelectric electron donating material: Fiber powder was added to water or an ethanol aqueous solution, and a plasticizer was added. Heating was conducted in a water bath to mix the solution evenly, the solvent was evaporated, and drying was conducted to obtain the HEC film with uniform texture and excellent transparency.

Step (2) specifically included: 4 g of HEC, 1.5 g of glucose, and 0.5 g of urea were weighed and added into 100 mL of deionized water, and stirred and heated in a water bath at 50° C. for 60 min. The obtained solution was centrifuged and degassed at 10,000 r/min for 5 min, and the solution was poured into a petri dish to bake for 12 h, and equilibrated under 50% air humidity for 3 h to obtain the HEC film.

(3) One end of the HEC film was fixed on the support bar of the wind cavity. A layer of conductive material was adhered as an electrode to the upper surface and the lower surface of the inner wall of the wind cavity, respectively, and a layer of triboelectric material was adhered outside the electrode with the triboelectric material completely covering the electrode.

(4) Lead wires from the top and bottom electrodes were connected to two pins at an AC terminal of a rectifier bridge, and the other two pins of the rectifier bridge were connected to external power receiving equipment to form the complete SE-TENG.

A working principle of the SE-TENG of the present disclosure was as follows.

When the wind blew, the HEC film contacted and was separated from the PDMS under the driving vibration of the wind, converting the wind energy into electric energy. In addition, the slit effect of the cavity could amplify the weak wind signal, such that the SE-TENG had ultra-high sensitivity to external stimuli, and the speed was as low as 0.5 m/s. The wind in the farmland caused the vibration of the HEC film in the cavity in the corresponding direction, and the induced electrical signals could be obtained from the top and bottom electrodes of the cavity.

In a specific implementation, the external power receiving equipment adopted light-emitting diode (LED) lights. When the wind blew, an induced voltage was generated in the wind cavity where the wind blew, which drove the LED lights to light up and point in the direction of the wind. By analyzing the generated electrical signal, the wind speed could be known to realize the sensing of wind vector information.

Figure 4:
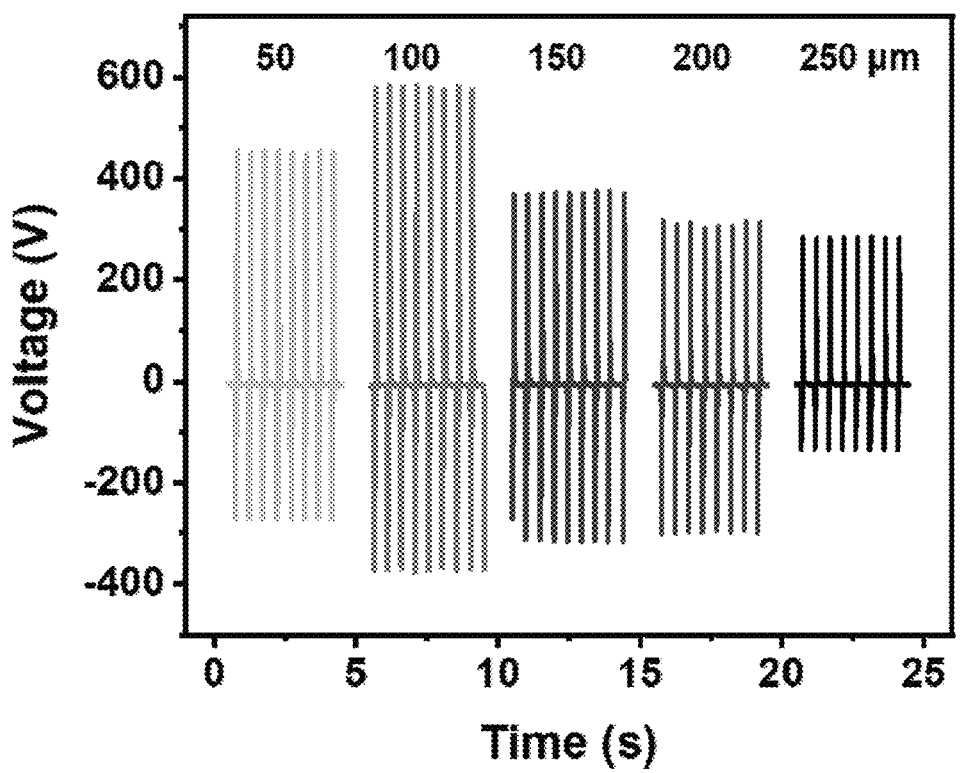
FIG. 4 is a graph showing a relationship between the output voltage signal of the SE-TENG and a thickness of an HEC film in an electron donating layer.

The above HEC-TENG was used for wind energy sensing. A blower was used to blow air at the inlet of a certain wind cavity, and the HEC film vibrated and contacted and was separated from the PDMS film under the driving of the wind to form an induced potential. The results of electrical signals sensed under different wind speeds are shown in FIG. 4. It can be seen from FIG. 4 that the generated voltage signal is positively correlated with the wind speed, indicating that the TENG can be used for wind energy sensing.

It can be seen from the implementation that the present disclosure has the characteristics of high sensitivity, high effect range, and simple preparation, which can maintain stable operation for a long time. It is also an excellent substitute for the traditional agricultural wind speed sensing and energy supply system. The TENG can not only be used for wind speed sensing but also serve as a sustainable power source for wireless sensors, providing a reliable foundation for building intelligent agriculture.

The technical solutions and beneficial effects of the present disclosure are further described in detail in the above specific examples. It should be understood that the above are merely specific examples of the present disclosure but are not intended to limit the present disclosure. Any modification, supplement, and equivalent replacement made within the principle scope of the present disclosure shall fall within the protection scope of the present disclosure.

Figure 2:
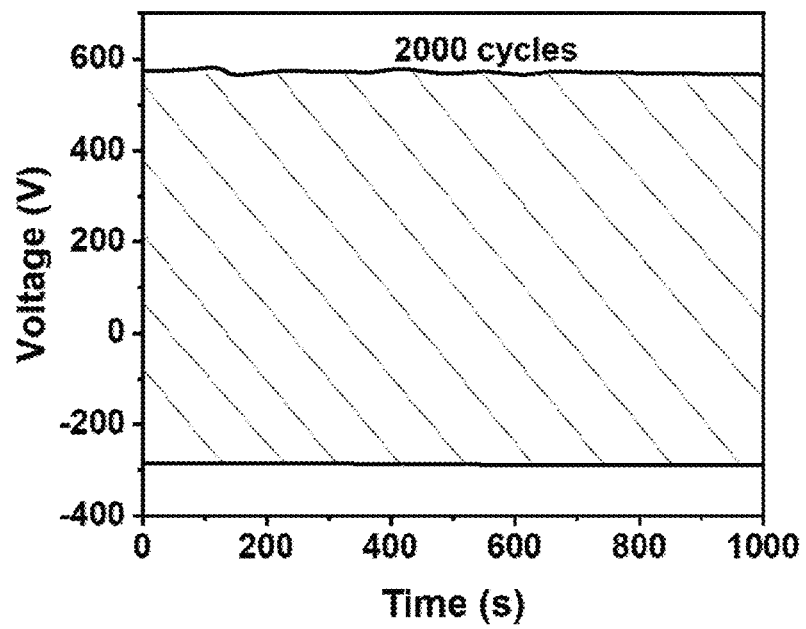
FIG. 2 is a graph showing the cycle stability test results of the SE-TENG.

In Example 2, the PDMS and the HEC film in the SE-TENG were placed on a linear motor, and the contact separation of the PDMS and the HEC film was realized under the traction of the linear motor. It could be seen from the experimental results that the output voltage signal could achieve stable output within 1,000 s, indicating that the SE-TENG could work stably (corresponding to FIG. 2).

Figure 3:
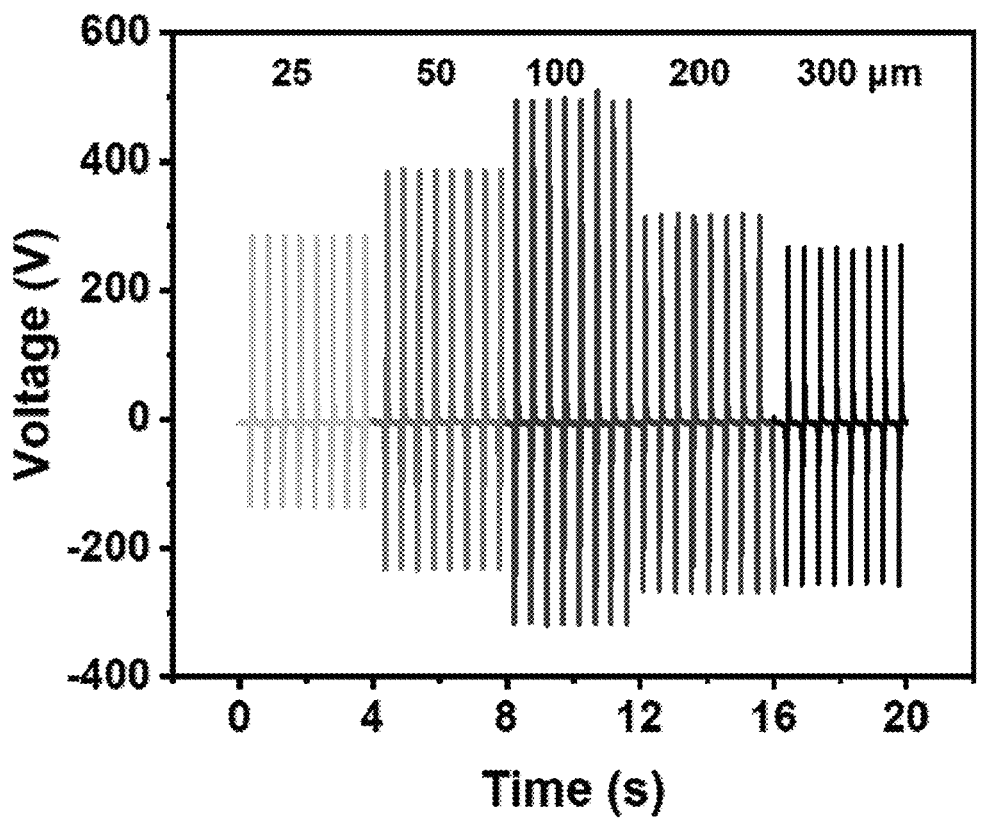
FIG. 3 shows a relationship between an output voltage signal of the SE-TENG and the thickness of PDMS in an electron capturing layer.

In Example 3, the thickness of the PDMS film in the SE-TENG was changed to 25, 50, 100, 200, and 300 μm, and the voltage signal output of the SE-TENG prepared with different thicknesses of PDMS was tested at a wind speed of 5 m/s. It can be seen from the figure that the output voltage signal is the largest when the thickness of the PDMS is 100 μm (corresponding to FIG. 3).

In Example 4, the HEC film thickness of the SE-TENG was changed to 50, 100, 150, 200, and 250 μm, and the voltage signal output of the SE-TENG prepared with different thicknesses of HEC films was tested at a wind speed of 5 m/s. It can be seen from the figure that the output voltage signal is the largest when the HEC film thickness is 100 µm (corresponding to FIG. 4).

Figure 5:
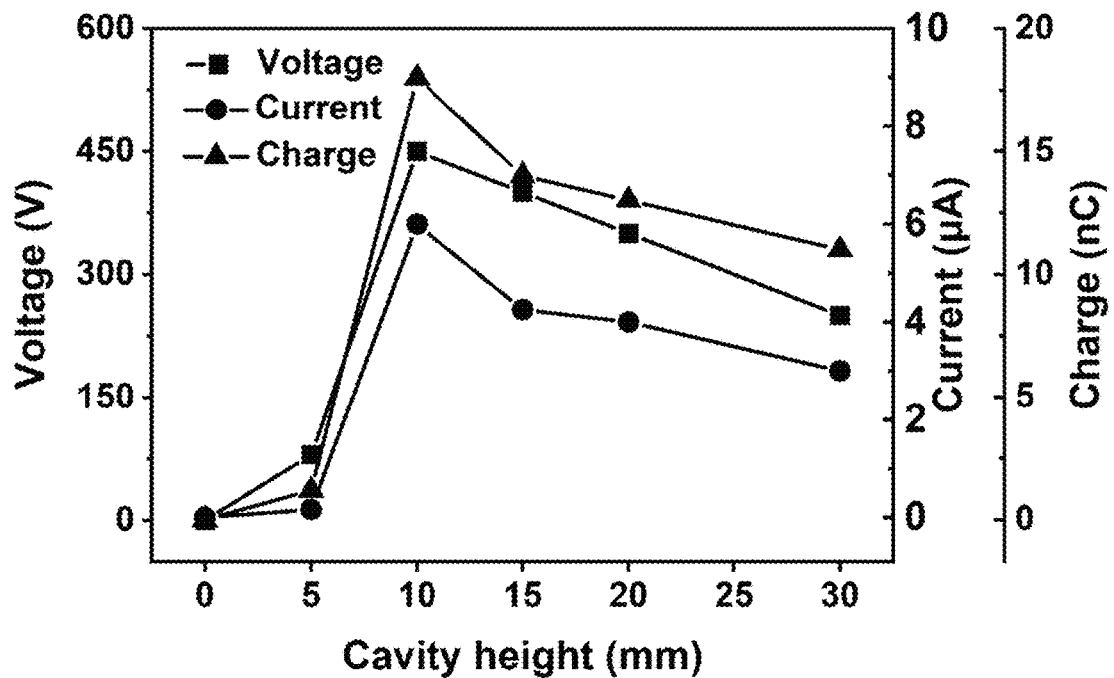
FIG. 5 is a schematic diagram of cavity height optimization of the SE-TENG.

In Example 5, the cavity height optimization of the SE-TENG was conducted. The cavities with heights of 5, 10, 15, 20, 25, and 30 mm were prepared by 3D printing, and the electrical signal output of the SE-TENG with different cavity heights was tested at a wind speed of 5 m/s. It can be seen that the electrical signal output is the largest when the cavity height is 10 mm (corresponding to FIG. 5).

Figure 6:
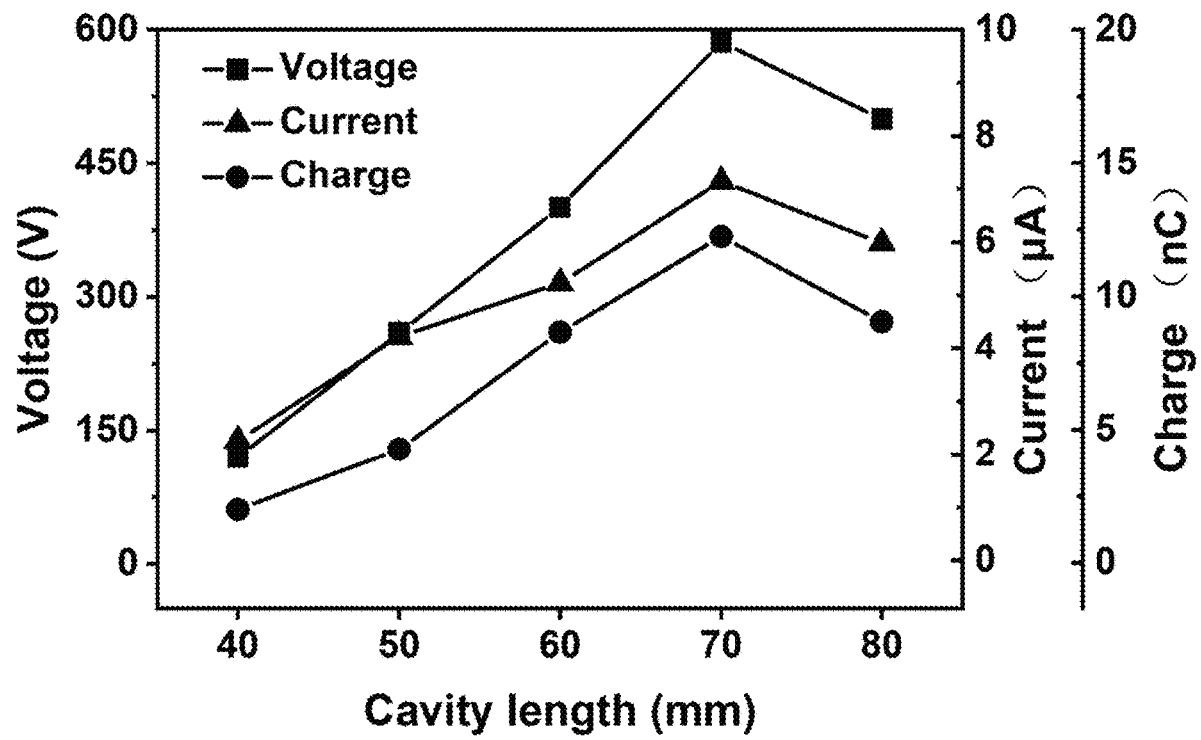
FIG. 6 is a schematic diagram of cavity length optimization of the SE-TENG.

In Example 6, the cavity length optimization of the SE-TENG was conducted. The cavities with lengths of 40, 50, 60, 70, and 80 mm were prepared by 3D printing, and the electrical signal output of the SE-TENGs with different cavity lengths was tested at a wind speed of 5 m/s. It can be seen that the electrical signal output is the largest when the cavity length is 70 mm (corresponding to FIG. 6).

Figure 7:
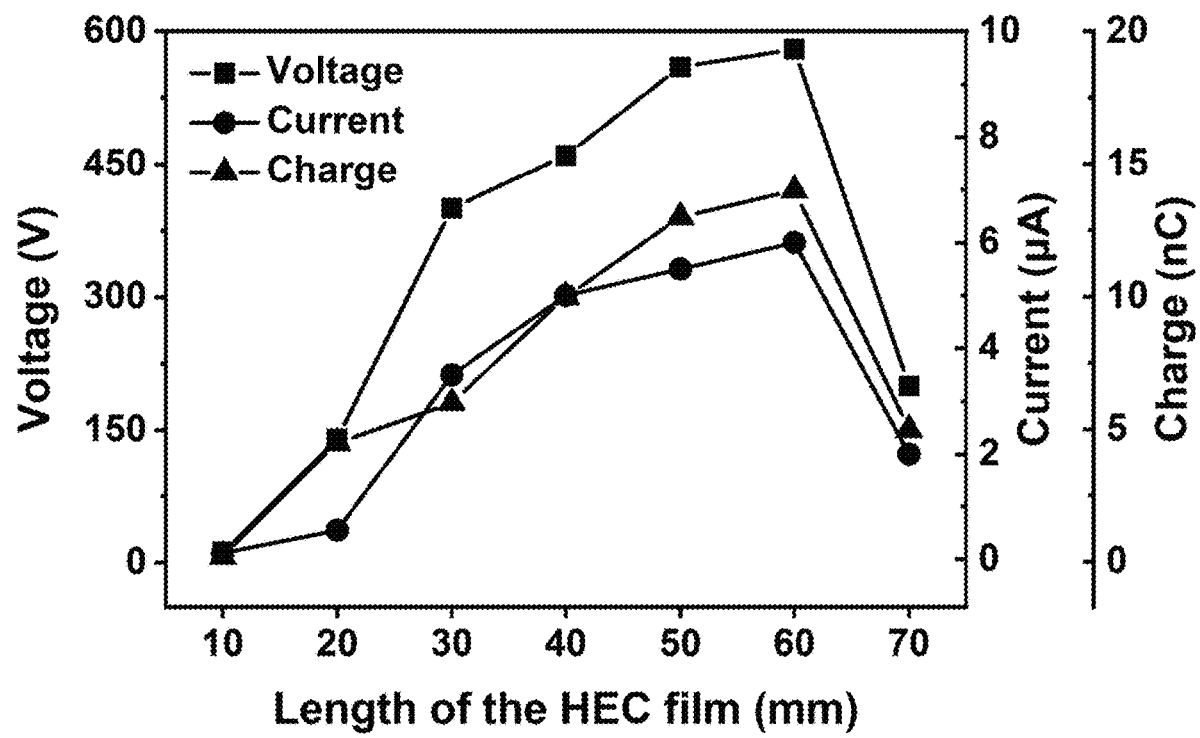
FIG. 7 is a schematic diagram of the HEC film length optimization of the SE-TENG.

In Example 7, the HEC film length optimization of the SE-TENG was conducted. HEC films with a width of 4.5 mm, a thickness of 100 µm, and lengths of 10, 20, 30, 40, 50, 60, and 70 mm were prepared by the casting method. The electrical signal output of the SE-TENG with different lengths of HEC films was tested at a wind speed of 5 m/s. It can be seen that the electrical signal output is the largest when the length of the HEC film is 60 mm (corresponding to FIG. 7).

The OWEH of the self-driven wind speed and wind direction sensing device includes at least SE-TENG with the slit effect and an electrometer DAQ board. The TENG is arranged on the electrometer DAQ board.

As shown in FIG. 1 and FIG. 8, the vibration of the HEC film of SE-TENG is amplified by the slit effect. The SE-TENG includes a wind cavity, a triboelectric layer, an HEC film, and ITO electrodes. The wind cavity is provided with an inlet end and an outlet end. A connecting line between the inlet end and the outlet end of the wind cavity is arranged parallel to and towards a wind direction. The wind cavity includes the inlet end connected to a horn-shaped cavity and the outlet end connected to a curved upward cavity.

One triboelectric layer is fixed on the upper surface and the lower surface of an inner wall of the wind cavity. The upper and lower triboelectric layers are arranged in parallel. The wind cavity is provided with a horizontally arranged support bar perpendicular to a wind direction in a middle close to the inlet end. The HEC film includes one end fixedly adhered to the support bar and the other end extending freely toward the outlet end. A layer of conductive material is adhered or plated between the triboelectric layer and the inner wall of the wind cavity as an electrode. The HEC film is used as a triboelectric electron donating layer, and the triboelectric electron donating layer is adhered to the middle of the wind cavity.

A distance between the upper and triboelectric layers is greater than the HEC film thickness, and the HEC film vibrates and swings with the wind when blown by the wind in a gap between the upper and lower triboelectric layers and reciprocates to contact the triboelectric layer, like a piece of cloth blown by the wind. The electrical signal output of the SE-TENG is realized through the contact and separation motion between the HEC film and the triboelectric layer.

The TENG of the present disclosure has four working modes, vertical contact-separation mode, lateral sliding mode, single-electrode mode, and freestanding triboelectric-layer mode. All four modes work.

Or the positions of the triboelectric layer and the HEC film are replaced with each other, that is, the triboelectric layer is adhered to the support bar of the wind cavity, and the HEC film is adhered to the upper and lower sides of the inner wall of the wind cavity.

Figure 9:
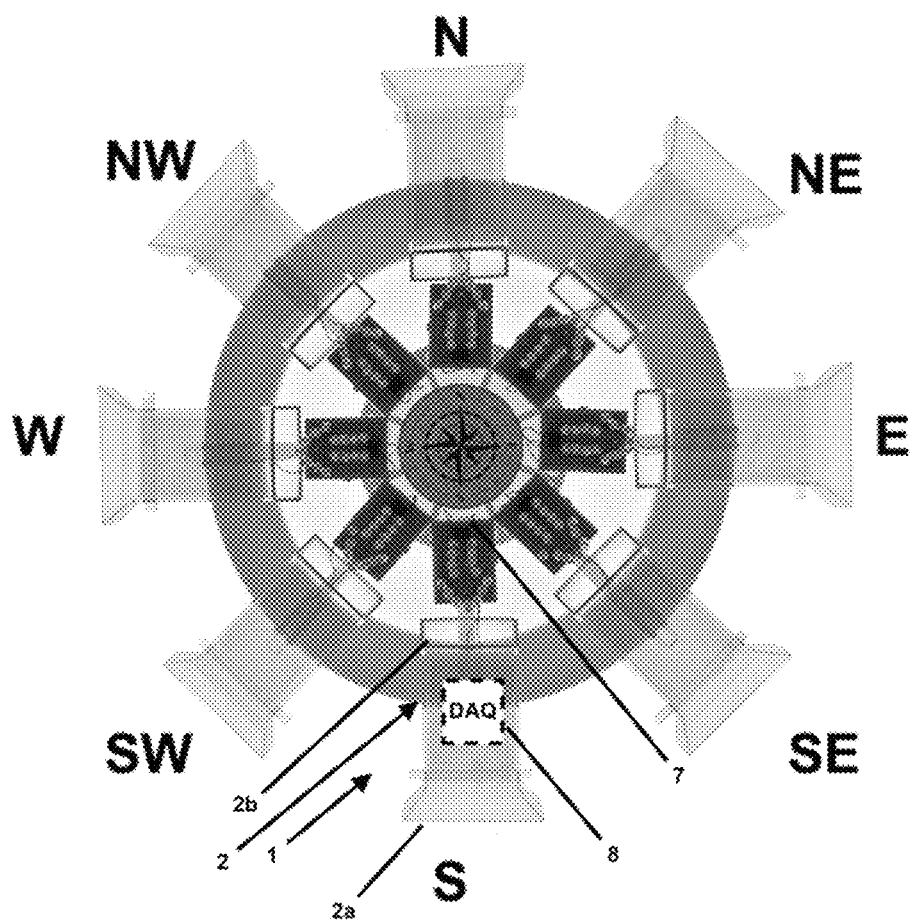
FIG. 9 shows a self-driven wind speed and wind direction sensing device composed of eight SE-TENGs designed by the present disclosure.

As shown in FIG. 9, eight SE-TENGs (1) are arranged. The eight SE-TENGs (1) are fixed on a circumference of a ring at an interval of a central angle of 45° in a radial direction. The eight SE-TENGs (1) are connected to the electrometer DAQ board (8). Electrical signals generated by the SE-TENGs (1) are acquired and processed through the electrometer DAQ board (8) and are wirelessly transmitted to a mobile terminal in real-time through Bluetooth. The outer peripheral surface of the ring is provided with a clamping groove, and the clamping groove is configured to install the SE-TENG (1).

In a specific implementation, the wind cavity of the self-driven wind speed and wind direction sensing device can be prepared by 3D printing. The horn-shaped cavity at the inlet of the wind cavity has a large diameter and a relatively narrow interior, such that the tiny wind can be amplified by the slit effect to realize high-sensitivity wind speed and wind direction sensing. One side of the HEC film is fixed in the middle of the wind cavity, and the other side is free. PDMS films and ITO electrodes are attached to the upper and lower inner walls of the wind cavity, and two wires are led from the top and bottom electrodes.

A working area inside the wind cavity has a size of 7 cm×5 cm×1 cm. Both the HEC and PDMS films used have a thickness of 100 µm.

In the present disclosure, the electrical signal generated by the SE-TENG is correlated with the wind speed, and the wind speed is sensed by the strength of the electrical signal generated by the SE-TENG. A higher strength of the electrical signal generated by the SE-TENG indicates a greater wind speed.

In addition, the plurality of SE-TENGs arranged along the circumference is used for sensing in different directions and orientations, and the wind direction is obtained by synthesizing the strength of the electrical signal of the plurality of SE-TENGs.

In the present disclosure, the HEC film prepared by the casting method is used for constructing the SE-TENG, and the HEC film can be cut into any desired shape.

A preparation process of the self-driven wind speed and wind direction sensing device of the present disclosure was as follows.

(1) The wind cavity was processed by 3D printing.
(2) The HEC film was prepared as a triboelectric electron donating material: Fiber powder was added to water or an ethanol aqueous solution, and a plasticizer was added. Heating was conducted in a water bath to mix the solution evenly, the solvent was evaporated, and drying was conducted to obtain the HEC film with uniform texture and excellent transparency.

Step (2) specifically included: 4 g of HEC, 1.5 g of glucose, and 0.5 g of urea were weighed and added into 100 mL of deionized water, and stirred and heated in a water bath at 50° C. for 60 min. The obtained solution was centrifuged and degassed at 10,000 r/min for 5 min. The solution was poured into a petri dish to bake for 12 h and equilibrated under 50% air humidity for 3 h to obtain the HEC film.

(3) One end of the HEC film was fixed on the support bar of the wind cavity, and a layer of conductive material was adhered as an electrode to the upper surface and the lower surface of the inner wall of the wind cavity, respectively, and a layer of triboelectric material was adhered outside the electrode with the triboelectric material completely covering the electrode.

(4) Lead wires from the top and bottom electrodes were connected to two pins at an AC terminal of a rectifier bridge (7 in FIG. 9), and the other two pins of the rectifier bridge were connected to external power receiving equipment to form the complete TENG.

(5) Eight SE-TENGs were distributed on a circumference of a ring at an interval of a central angle of 45° in a radial direction and cooperated with an electrometer DAQ board to form the self-driven wind speed and wind direction sensing device.

A working principle of the self-driven wind speed and wind direction sensing device of the present disclosure was as follows.

When the wind blew, the HEC film contacted and was separated from the PDMS under the driving vibration of the wind, converting the wind energy into electric energy. In addition, the slit effect of the cavity could amplify the weak wind signal, such that the self-driven wind speed and wind direction sensing device had ultra-high sensitivity to external stimuli, and the speed was as low as 0.5 m/s. The wind in the farmland caused the vibration of the HEC film in the cavity in the corresponding direction, and the induced electrical signals could be obtained from the top and bottom electrodes of the cavity.

Eight self-driven wind speed and wind direction sensing devices at an interval of 45° were fixed on the ring through the clamping groove in the radial direction to form a self-driven wind speed and wind direction sensing device in the agricultural environment. The electrometer DAQ board acquired and analyzed the output signal of the self-driven wind speed and wind direction sensing device and wirelessly transmitted the information to the mobile phone through Bluetooth, such that the wind speed and wind direction information could be obtained in real-time, and agricultural production could be adjusted in time. In addition, the electric energy generated by the self-driven wind speed and wind direction sensing device during wind speed sensing could also be used to drive agricultural sensors.

In a specific implementation, the external power receiving equipment used LED lights. When the wind blew, an induced voltage was generated in the wind cavity where the wind blew, which drove the LED lights to light up and point in the direction of the wind. By analyzing the generated electrical signal, the wind speed and wind direction could be known to realize the sensing of wind vector information.

Figure 10:
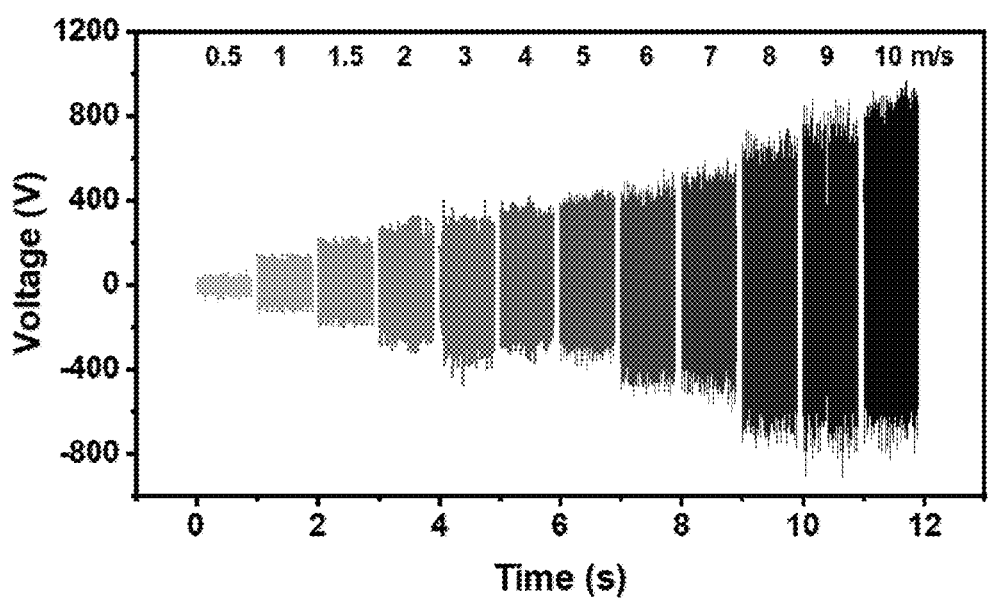
FIG. 10 is a graph showing the results of a voltage generated by any wind cavity of the self-driven wind speed and wind direction sensing device designed by the present disclosure under different wind speeds.
Figure 11:
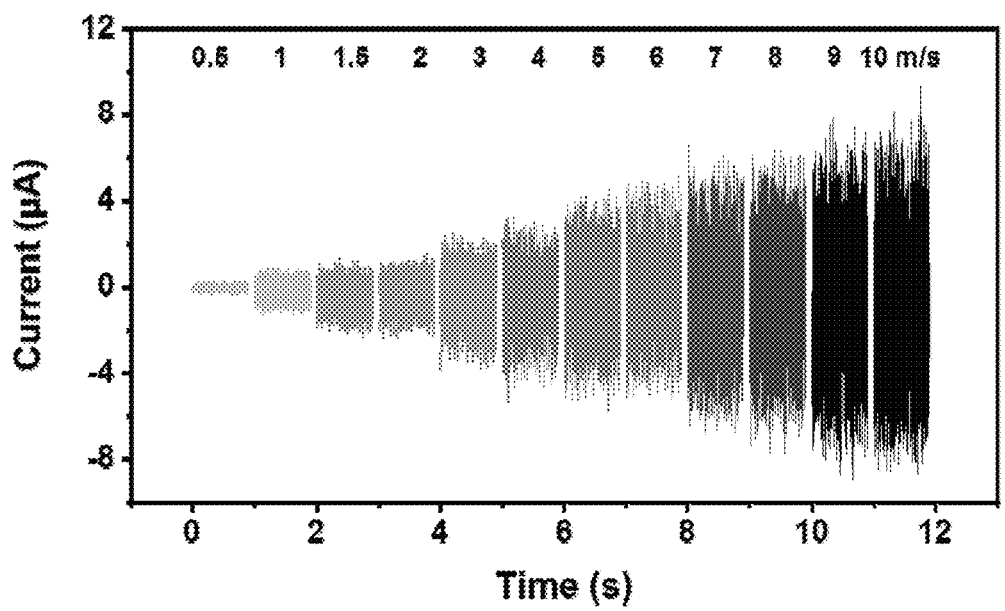
FIG. 11 is a graph showing the results of a current generated by any wind cavity of the self-driven wind speed and wind direction sensing device designed by the present disclosure under different wind speeds.
Figure 12:
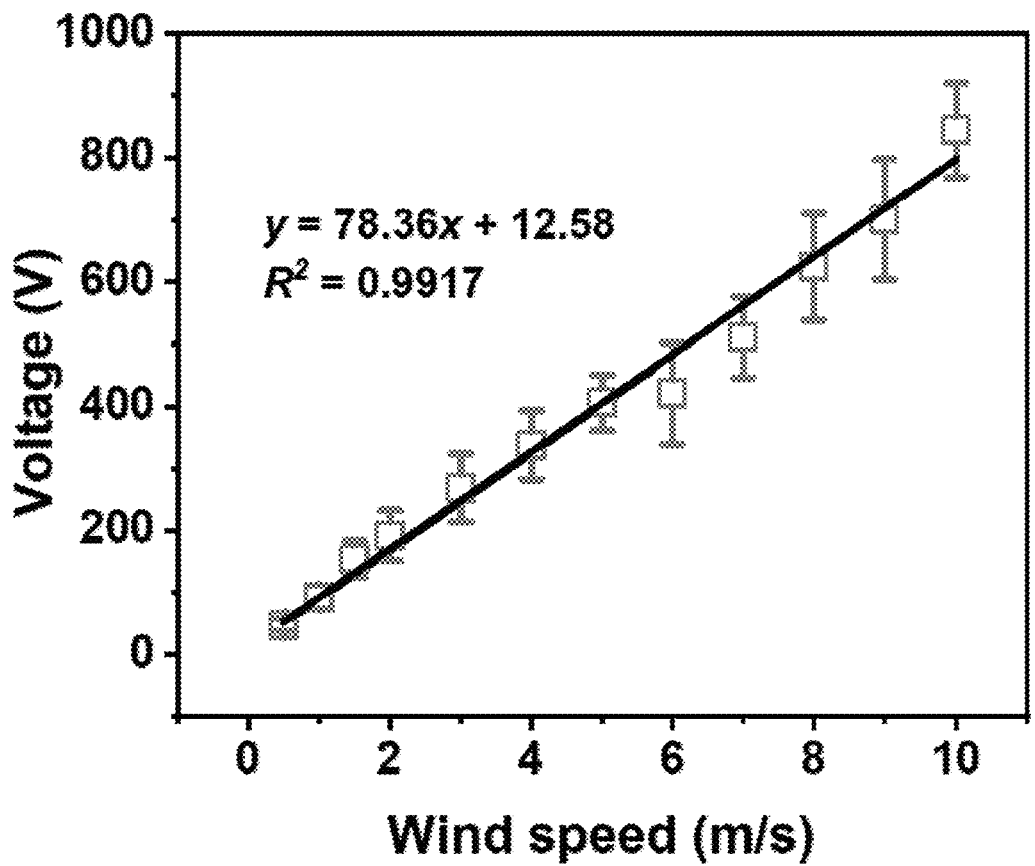
FIG. 12 shows a linear fitting relationship between the wind speed and the voltage of any wind cavity of the self-driven wind speed and wind direction sensing device designed by the present disclosure.

The above HEC-TENG was used for wind energy sensing. A blower was used to blow air at the inlet of a certain wind cavity, and the HEC film vibrated and contacted and was separated from the PDMS film under the driving of the wind to form an induced potential. The results of electrical signals sensed under different wind speeds are shown in FIG. 10, FIG. 11, and FIG. 12. It can be seen that both the generated voltage signal and current signal are positively correlated with the wind speed, indicating that the self-driven wind speed and wind direction sensing device can be used for wind energy sensing.

FIG. 12 shows a linear fitting relationship between the wind speed and the voltage. The wind speed can be calculated according to the obtained voltage, indicating that the self-driven wind speed and wind direction sensing device can be used for wind energy sensing.

It can be seen from the implementation that the present disclosure has the characteristics of high sensitivity, high effect range, and simple preparation, which can maintain stable operation for a long time. It is also an excellent substitute for the traditional agricultural wind speed and wind direction sensing and energy supply system. The SE-TENG can not only be used for wind speed and wind direction sensing but also serve as a sustainable power source for wireless sensors, providing a reliable foundation for building intelligent agriculture.

Figure 13:
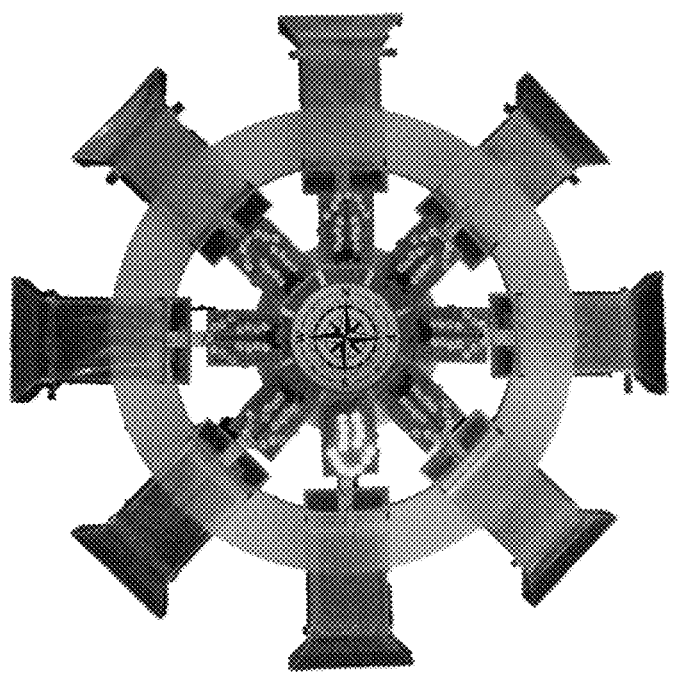
FIG. 13 is a schematic diagram of wind direction sensing of a wind cavity in an S direction of the self-driven wind speed and wind direction sensing device designed by the present disclosure.

FIG. 13 is a schematic diagram of wind direction sensing in an S direction. When the wind blows from the S direction, the HEC film in the SE-TENG in the S direction is caused to beat the PDMS film up and down, and electric energy is generated to light up the LED light in this direction. The direction in which the LED lights up is the direction of the wind, realizing wind direction sensing.

The technical solutions and beneficial effects of the present disclosure are further described in detail in the above specific examples. It should be understood that the above are merely specific examples of the present disclosure but are not intended to limit the present disclosure. Any modification, supplement, and equivalent replacement made within the principle scope of the present disclosure shall fall within the protection scope of the present disclosure.

What is claimed is:

1. A self-driven wind speed and wind direction sensing device, wherein the self-driven wind speed and wind direction sensing device comprises:
    eight triboelectric nanogenerators (TENGs); and
    an electrometer data acquisition (DAQ) board, wherein each of the TENGs is arranged on the electrometer DAQ board;
    wherein each of the TENGs comprises
        a wind cavity,
        a plurality of triboelectric layers,
        a hydroxyethyl cellulose (HEC) film,
        a top electrode comprising a conductive material layer adhered or plated to the upper surface of the inner wall of the wind cavity,
        a bottom electrode comprising a conductive material layer adhered or plated to the upper surface of the inner wall of the wind cavity,
        a rectifier bridge connected to the top electrode and bottom electrode,
        wherein the wind cavity is provided with an inlet end and an outlet end,
        wherein one triboelectric layer of the plurality of triboelectric layers is each fixedly adhered to completely cover the top electrode and the bottom electrode, respectively,
        wherein the wind cavity is provided with a horizontally arranged support bar perpendicular to a wind direction in a middle adjacent to the inlet end of the wind cavity, and
        wherein the HEC film comprises one end fixedly adhered to the support bar, and the other end of the HEC film extending freely toward the outlet end of the wind cavity;
        wherein the wind cavity comprises the inlet end connected to a horn-shaped cavity and the outlet end connected to a curved upward cavity;
        wherein the wind cavity is formed by 3D printing;
        wherein the HEC film was prepared by: adding a fiber powder to water or an ethanol aqueous solution, adding a plasticizer, heating in a water bath to mix the solution evenly, evaporating a solvent, and drying to obtain the HEC film;
        wherein the rectifier bridge comprises four pins and wherein lead wires connect the top electrode and the bottom electrode to two of the pins at an alternating-current (AC) terminal of the rectifier bridge and two other pins of the rectifier bridge are for connecting to an external power receiving equipment;

wherein the eight TENGs are distributed on a circumference of a ring at an interval of a central angle of substantially 45° and cooperating with the electrometer DAQ board.

2. The self-driven wind speed and wind direction sensing device according to claim 1, wherein electrical signals generated by the TENGs are acquired and processed through the electrometer DAQ board and the electrometer DAQ board is configured to wirelessly transmit to a mobile terminal in real-time through Bluetooth.

3. The self-driven wind speed and wind direction sensing device according to claim 1, wherein each triboelectric layer is made from one selected from the group consisting of polytetrafluoroethylene (Teflon), polydimethylsiloxane (PDMS), polyimide (Kapton), polyvinyl chloride (PVC), silicone rubber (Ecoflex), and polylactic acid (PLA).

4. The self-driven wind speed and wind direction sensing device according to claim 1, wherein the conductive material of each of the top electrode and the bottom electrode is one selected from the group consisting of indium tin oxide (ITO), silver nanowires, copper, and aluminum.

5. A preparation method for the self-driven wind speed and wind direction sensing device according to claim 1, comprising:

1) processing the wind cavity by 3D printing;

2) preparing the HEC film: adding a fiber powder to water or an ethanol aqueous solution, adding a plasticizer, heating in a water bath to mix the solution evenly, evaporating a solvent, and drying to obtain the HEC film;

3) fixing one end of the HEC film on the support bar of the wind cavity, adhering or plating a layer of a conductive material as a top electrode and a bottom electrode to the upper surface of the inner wall of the wind cavity and the lower surface of the inner wall of the wind cavity, respectively, and adhering a layer of a triboelectric material completely covering each of the top and bottom electrodes;

4) connecting lead wires from the top electrode and the bottom electrode to two pins at an AC terminal of a rectifier bridge, and connecting the two other pins of the rectifier bridge to an external power receiving equipment to form the complete TENG; and 5) distributing eight TENGs on a circumference of a ring at an interval of a central angle of 45° and cooperating with the electrometer DAQ board to form the self-driven wind speed and wind direction sensing device.

6. The preparation method for the self-driven wind speed and wind direction sensing device according to claim 5, wherein the plasticizer is a mixture of glucose and urea.

7. The preparation method for the self-driven wind speed and wind direction sensing device according to claim 6, wherein step 2) specifically comprises weighing and adding 1-5 g of HEC, 0.3-1.5 g of glucose, and 0.1-0.5 g of urea into 100 mL of deionized water, stirring and heating in the water bath at 50° C. for 60 min, centrifuging and degassing an obtained solution at 10,000 r/min for 5 min, pouring the solution into a petri dish to bake for 6-12 hours, and equilibrating under a 30-80% air humidity for 3 hours to obtain the HEC film.

8. The preparation method according to claim 5, wherein electrical signals generated by the TENGs are acquired and processed through the electrometer DAQ board and are wirelessly transmitted to a mobile terminal in real-time through Bluetooth.

9. The preparation method according to claim 5, wherein each triboelectric layer is made from one selected from the group consisting of polytetrafluoro ethylene (Teflon), polydimethylsiloxane (PDMS), polyimide (Kapton), polyvinyl chloride (PVC), silicone rubber (Ecoflex), and polylactic acid (PLA).

10. The preparation method according to claim 5, wherein the conductive material of each of the top electrode and the bottom electrode is one selected from the group consisting of indium tin oxide (ITO), silver nanowires, copper, and aluminum.

* * * * *